Sept. 2, 1952  E. OKLEJAS  2,609,115
SELF-UNLOADING CONVEYER BODY
Filed Sept. 26, 1949  6 Sheets-Sheet 1

Fig. 1.

Eli Oklejas
INVENTOR
BY Cahnowles
ATTORNEYS.

Sept. 2, 1952 E. OKLEJAS 2,609,115
SELF-UNLOADING CONVEYER BODY
Filed Sept. 26, 1949 6 Sheets-Sheet 3

Eli Oklejas
INVENTOR
BY C. A. Snowles.
ATTORNEYS.

Sept. 2, 1952  E. OKLEJAS  2,609,115
SELF-UNLOADING CONVEYER BODY
Filed Sept. 26, 1949  6 Sheets-Sheet 4

Fig. 4.

Eli Oklejas
INVENTOR
BY Snow&Co.
ATTORNEYS.

Sept. 2, 1952 E. OKLEJAS 2,609,115
SELF-UNLOADING CONVEYER BODY
Filed Sept. 26, 1949 6 Sheets-Sheet 5

Eli Oklejas
INVENTOR
BY C. A. Snow & Co.
ATTORNEYS.

Sept. 2, 1952 E. OKLEJAS 2,609,115
SELF-UNLOADING CONVEYER BODY
Filed Sept. 26, 1949 6 Sheets-Sheet 6

Eli Oklejas
INVENTOR
BY C.A. Snow & Co.
ATTORNEYS

Patented Sept. 2, 1952

2,609,115

UNITED STATES PATENT OFFICE 2,609,115

SELF-UNLOADING CONVEYER BODY

Eli Oklejas, Bolles Harbor, Mich.

Application September 26, 1949, Serial No. 117,789

9 Claims. (Cl. 214—83.26)

This invention relates to an improved self unloading conveyor body of the type shown, for example, in my prior Patent 2,275,799 issued March 10, 1942.

An important object of the present invention is to provide, in a structure of the character stated, a generally improved construction for a self unloading conveyor body embodying a material-receiving body or hopper of novel design adapted for mounting upon a vehicle and for supporting the remaining parts of the structure; an improved conveyor arrangemnt including a main or scraper conveyor traversing the underside of the body longitudinally thereof, and an auxiliary or discharge conveyor to which the material is fed by the first conveyor, the discharge conveyor being adapted to swing in vertical and horizontal planes; an improved drive means for the conveyors adapted to permit joint operation or single conveyor operation as desired; and an improved arrangement for permitting the discharge of material from the hopper to the scraper conveyor.

Another important object of the invention is to provide, in said discharge conveyor, an improved telescoping conveyor design adapted to form a conveyor of selected length without affecting the operation thereof in any manner.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Referring to the drawings in detail, 5 is any suitable vehicle on which the structure is mounted, a truck chassis being illustrated in the present instance.

On the vehicle 5 is mounted a material-receiving body generally designated 6 and comprising a support for all other portions of the structure. Preferably, the body is of generally rectangular or box-like construction, including the rectangular front and rear end walls 7 and 8 respectively, between which extend, longitudinally of the body, the upwardly diverging side walls 9 merging near the top of the body into vertical upper side wall portions flanged along their upper longitudinal edges. Grooved end guides 11 are mounted upon said flanges at the opposite ends of the body 6, for the purpose of supporting an extension plank 12 along each side of the body, if it is necessary to extend the body upwardly for the purpose of increasing its material handling capacity.

The body 6 is provided with a plurality of transversely extended vertical partitions 13, so as to define a plurality of material-receiving compartments, the side walls of which will be inclined by reason of the provision of the inclined side walls 9 of the body, and the end walls of which will also be inclined near their lower ends, by the provision of inclined portions 14 on the partitions 13.

The entire body may be provided with a rectangular bottom 15, on the side edges of which can be extended upwardly the posts or supports 16 for bracing the body, and closing the space defined between the supports 16 and inclined side walls 9 can be the doors 17. Thus, the body is given a generally rectangular or box-like shape despite the provision of downwardly tapering compartments therewithin, the triangular side spaces resulting from this construction being adapted to provide compartments for construction tools such as shovels, spare parts, or any other objects for which a storage space on a vehicle of this type might be desired.

It will be understood that any other external or internal framing that might be desired for the purpose of reinforcing the body can of course be utilized if desired or necessary.

A body 6 formed as described above is equipped with gates removably closing the bottoms of the several material compartments. To this end, I mount slidably near the lower end of each compartment a gate 19 formed as a flat horizontally disposed plate located approximately in the plane of longitudinally extended frame members 20 extending along one side of the body. The gates 19 are each mounted slidably in a pair of spaced parallel guides 18 formed from angle iron material and when slid in one direction upon its guides, a gate 19 will close the bottom of its associated compartment. When slid in the other direction, the gate will open the bottom of said compartment for the purpose of permitting the material held therein to gravitate to a scraper conveyor to be described hereinafter.

For the purpose of reciprocating the gates 19, I provide a large sprocket 21 for each gate (see Figs. 6 and 7) rotatably mounted in the frame member 20, the shaft of each sprocket 21 having rigid therewith the guide sleeve 22 in which is slidably mounted the hand crank 23 which can be adjusted as to length by slidable movement within the guide sleeve, and which can be secured in adjusted position by means of set screw 24.

Figures 5, 6, 7:
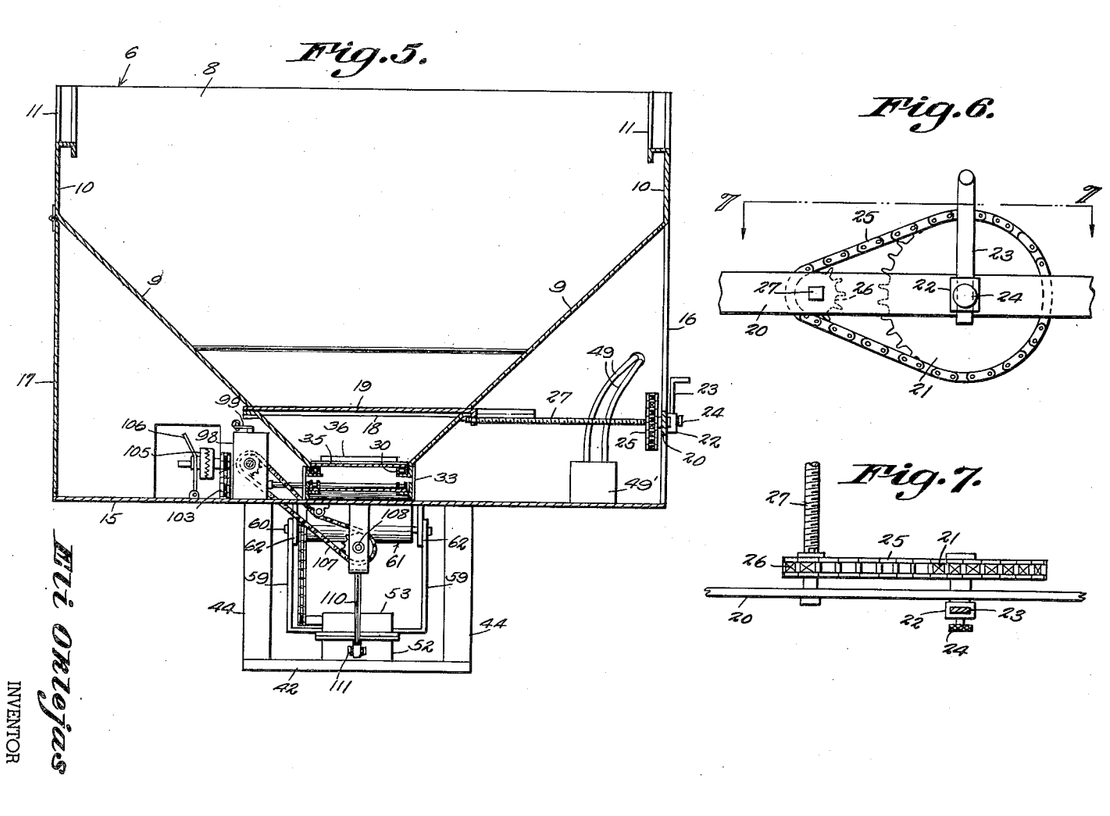
Fig. 5 is a section on line 5—5 of Fig. 4.
Fig. 6 is an enlarged fragmentary side elevation of the gate opening means.
Fig. 7 is a top plan view thereof.

Passed around the large sprocket 21 is the chain 25, that also passes around the small sprocket 26 rotatably mounted in the frame member 20, the small sprocket 26 being rigid with an elongated screw 27 extended into a threaded opening formed in one end of the gate 19.

By reason of this construction, it will be seen that by rotation of the crank 23 previously adjusted to desired length, the gate 19 can be opened or closed as desired, the screw 27 rotating for the purpose of causing the gate to be advanced therealong in either direction.

The construction of the gate and the opening means therefor described above is particularly adapted to provide a high speed gate opening construction.

The construction of the body and of the high speed gates having been described, it is appropriate to describe the construction of the scraper conveyor that traverses the body longitudinally and is adapted to receive material gravitating through the open bottoms of the compartments after the gates 19 have been shifted to compartment opening position. The scraper conveyor is particularly illustrated in Figs. 10 through 12 and at the tail end I provide the transversely extended idler shaft 28 on which are mounted the spaced idler sprockets 29 around which pass the endless chains 30 that also pass around the drive sprockets 31 at the head end of the scraper conveyor, the drive sprockets 31 being mounted upon the scraper conveyor drive shaft 32. Shafts 28 and 32 are journaled in opposite ends of a suitably formed scraper conveyor frame 33.

Figure 10:
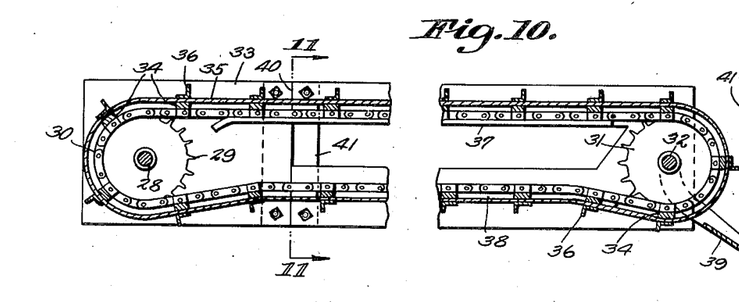
Fig. 10 is a fragmentary enlarged longitudinal section through the scraper conveyor.
Figure 11:
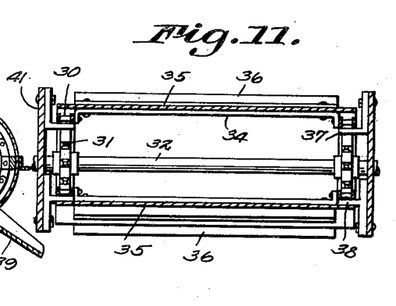
Fig. 11 is a section on line 11—11 of Fig. 10.
Figure 12:
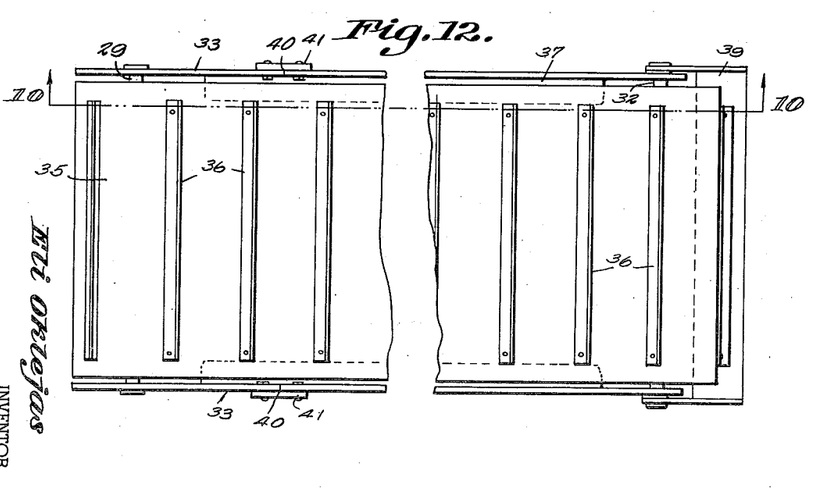
Fig. 12 is a top plan view of said scraper conveyor.

Throughout the length of the endless chains 30, I provide, at spaced intervals, the transversely extended cross bars 34 providing a support for a conveyor belt 35 which may be equipped with spaced cleats 36, rivets or any other suitable fastening means being used to secure the cross bars 34, belt 35, and cleats 36 to complete the construction of the scraper conveyor belt.

For the purpose of preventing sagging of the intermediate portion of the scraper conveyor, there are provided, as component parts of the conveyor frame or pan 33, the upper guides 37 supporting the upper course of the scraper conveyor belt, lower guides 38 being utilized to support the lower course of said belt and also comprising a part of the conveyor frame. The upper guides 37 can comprise angle iron material, while the lower guides can be formed from T iron material, as best seen from Fig. 11.

Figure 1:
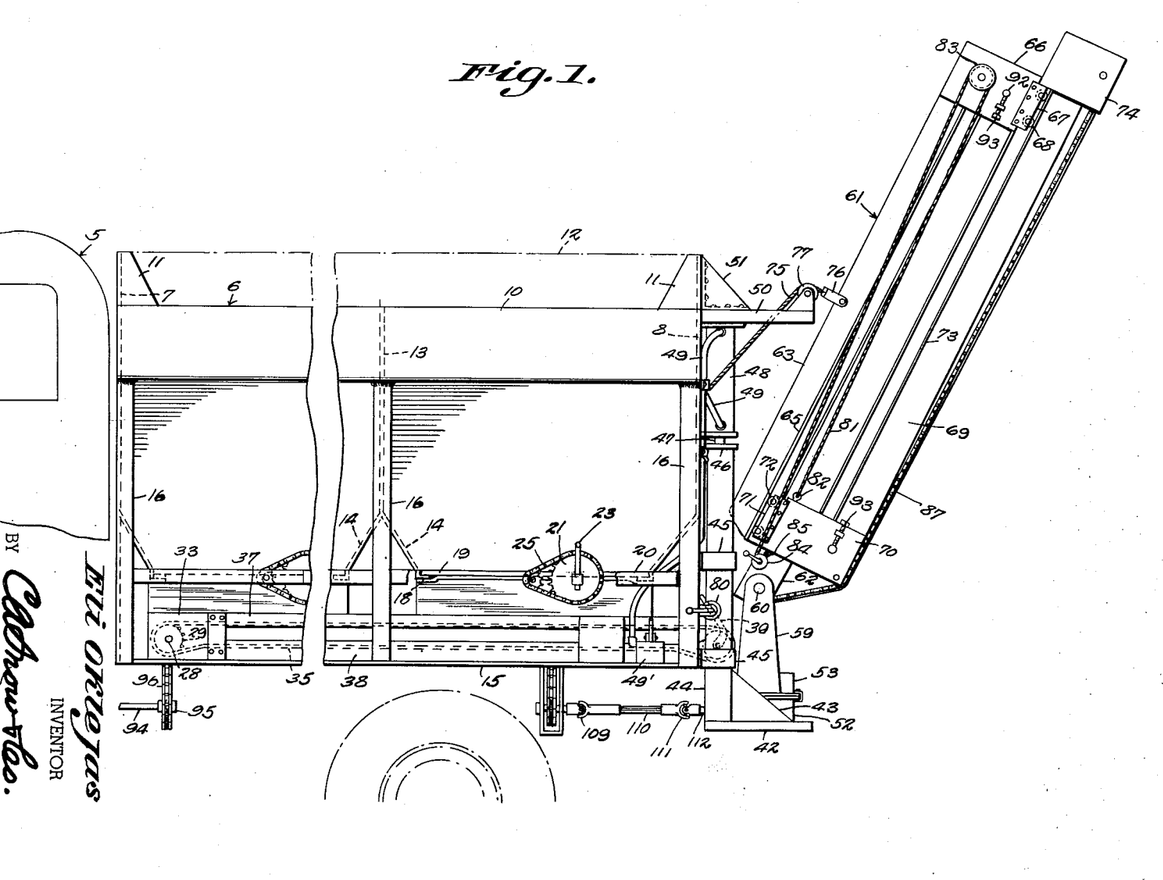
Fig. 1 is a side elevation of the structure.

Pivotally mounted upon the shaft 32 is a short discharge chute 39, which can be swung upwardly as shown in Fig. 1 to an inoperative position when the self unloading conveyor body is not in use. When said body is in use, the discharge chute 39 is pivotally swung to the position shown in Figs. 10 and 2, and in this position, material discharged from the head end of the scraper conveyor will gravitate to the chute 39, so as to be fed to a discharge conveyor to be described hereinafter.

I prefer that the tail end of the conveyor frame be made detachable, for the purpose of permitting ready disassembly of the scraper conveyor assembly and removal of component parts thereof for cleaning or repair, and to this end, the tail end of the conveyor frame can be connected to the remaining portion of said frame by a joint 40 secured by plate 41.

Thus, there is provided a scraper conveyor that extends longitudinally of the underside of the hollow body, for the purpose of receiving material gravitating from the compartments after the gates 19 have been moved to open position, and said material will be carried by said scraper conveyor to the rear end of the conveyor body, that is the head end of the conveyor, for gravitation to a discharge conveyor to be described.

In connection with this discharge conveyor, I provide a discharge conveyor support that is movably mounted upon the rear end of the body. In this connection, said support in the present instance is mounted for vertical sliding movement upon the rear end of the body 6 in a manner to be described.

Figure 3:
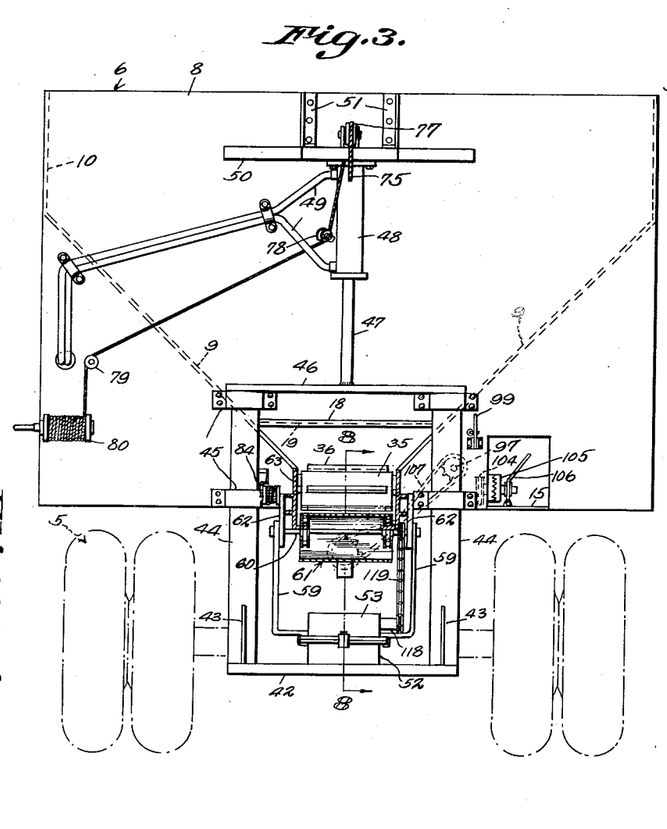
Fig. 3 is a section on line 3—3 of Fig. 2.

The support for the discharge conveyor, in this connection, comprises at its lower end the horizontally extended platform 42 rigidly connected as by gussets 43 and by welding to the lower ends of a pair of vertically disposed tubular guides 44 (see Fig. 3) having up and down sliding movement in guide brackets 45 secured to the rear end wall 8 of the body. The upper ends of the tubular guides 44 are connected by a header 46, the medial portion of which is rigidly secured to the lower end of a vertically disposed ram 47 working in hydraulic cylinder 48 controlled through the medium of hoses 49 through which fluid is pumped, a hand pump 49' being used for this purpose in the present instance.

Thus, there is provided at the rear end of the body a discharge conveyor support that has up and down movement and which is equipped with means for controlling said movement, said means being under the control of an operator. In the inoperative position of the discharge conveyor, said support is moved upwardly to the position shown in Fig. 1, but when the discharge conveyor is to be used, the support is adjusted downwardly to the position shown in Fig. 2.

I include, in my structure, a means universally connecting one end of the discharge conveyor to the above described support. To this end, I provide a gear box including a lower section 52 cup-like in general configuration, and fixedly mounted upon the platform 42. As particularly shown in Fig. 8, the gear box also includes an upper section 53 of inverted cup-like shape, the two sections being formed with annular flanges 54 between which is interposed a ball bearing 55 for rotatable mounting of the upper section upon the lower section. Means for locking the upper section 53 in positions to which it is rotatably adjusted is provided, comprising clamps 56 equipped with bolts threadable therein and against the flange of the upper gear box section 53, so as to cause the flanges of both sections to be tightened against each other for the purpose of preventing their normal free relative rotation.

Figure 8:
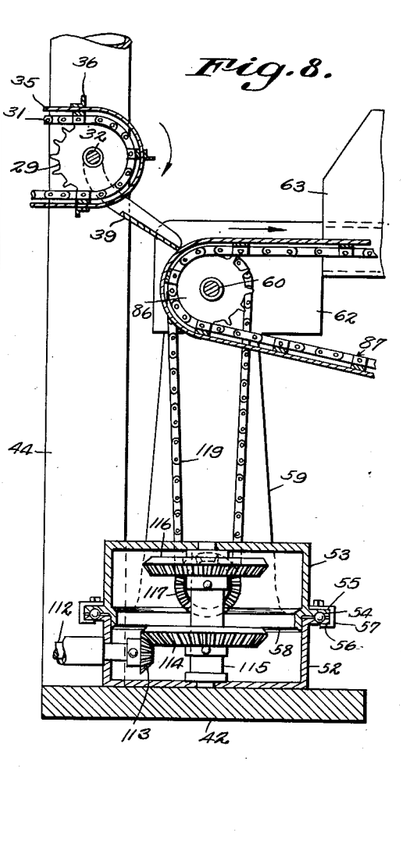
Fig. 8 is an enlarged section on line 8—8 of Fig. 3.

Rigid with the upper gear box section 53, and fixedly mounted upon diametrically opposite portions of the flange of said upper section, are the upstanding arms 59 between the upper ends of which is extended the shaft 60 on which the discharge conveyor, generally designated 61, is pivotally mounted.

By reason of this construction, it is seen that there is provided a universal mounting of the discharge conveyor upon the vertically slidable support therefor, the discharge conveyor swinging in a vertical plane upon the shaft 60, and swinging in a lateral plane by the provision of a rotatable upper gear box section 53.

Describing now the construction of the discharge conveyor, this comprises basically telescopically related tail and head discharge conveyor sections.

The tail discharge conveyor section is provided at one end with the end plates 62 through which the shaft 60 extends. Rigid with these end plates are the parallel elongated side plates 63 suitably cross braced at 64, and extended longitudinally of each side plate 63 and rigidly secured thereto is a channel member 65, plate 63 and channel member 65 being rigid at their head ends with depending bearing plates 66. Mounted on the lower ends of the depending bearing plates 66 at the head end of the tail conveyor section are the trolleys 67 equipped with rollers 68.

Describing now the head discharge conveyor section, this is in construction substantially identical to the tail section except for being inverted and reversed. Said head section includes side plates 69 rigid at one end with bearing plates 70 extended upwardly from the tail end of the head section, there being extended upwardly from the respective bearing plates 70 the trolleys 71 equipped with rollers 72 that are received in the channel member 65 of the tail section.

At the other end of the head discharge conveyor section, I provide the end plates 74.

In this connection, the rollers 72 are received in the channel members 73 provided on the respective side plates 69, and a telescoping discharge conveyor frame is thus provided.

I provide a means for bodily adjusting the discharge conveyor assembly in a vertical plane, and for this purpose, I provide the cable 75 connected at one end to the cross member 76 that can be secured to the tail discharge conveyor section at a point intermediate the ends of said section. Cable 75 is trained over pulley 77 mounted upon the supporting plate 50 that is rigidly secured to the rear end wall of the body, and is reinforced by gussets 51. After having been passed over the pulley 77, the cable 75 is trained around direction changing pulley 77, 78 respectively and extends to a drum 80 whereby, under the control of an operator, the crank equipped drum can be rotated for the purpose of hoisting or lowering the discharge conveyor structure.

I also provide a means, under the control of an operator, for extending or retracting the telescoping discharge conveyor, and to this end I provide a cable 81 one end of which is connected as at 82 to the tail end of the head conveyor section, the cable being extended from said connection around a pulley 83 mounted upon the head end of the tail discharge conveyor section, and being thereafter extended to a crank operated drum 84, after which the cable is extended back to the tail end of the head conveyor section and is connected thereto as at 85. By reason of this construction, rotation of the drum in one direction will extend the telescopic conveyor as desired, while rotation in the other direction will retract it, under the control of an operator, and ordinary means embodied in conventional hand winches can be employed to retain the telescoped sections in adjusted relation. This completes the description of the means for moving the head and tail discharge conveyor sections to adjustably telescoped positions, and there will now be described the construction and arrangement of the discharge conveyor belt relative to said sections. As seen from Fig. 8, I mount upon the shaft 60 the drive sprockets 86 around which passes the endless conveyor belt generally designated 87, and formed like the scraper conveyor belt. This belt is extended from the drive sprockets 86 around idler sprockets 88 (see Fig. 2), thence to idler sprockets 89 at the head end of the head conveyor section, and thence around sprockets 90 at the tail end of said head conveyor section. From this point, the endless belt is passed around sprockets 91 rotatably mounted upon the head end of the tail section, and thence back to the drive sprockets 86.

The sprockets 91 are mounted upon a shaft 92, and adapted for being shifted against said shaft, and also against the shaft of the sprockets 90, are the threaded lock members 93 constituting a friction lock.

By reason of the above described belt construction and arrangement, it may be observed that the conveyor belt 87 will always be under proper tension, regardless of the overall length of the discharge conveyor. In other words, even when the discharge conveyor is fully retracted, with the head and tail sections fully telescoped as in Fig. 1, the conveyor belt 87 will be under full tension. The same is true when the conveyor sections are fully extended, or partially extended to any desired length as in Fig. 2.

Figure 4:
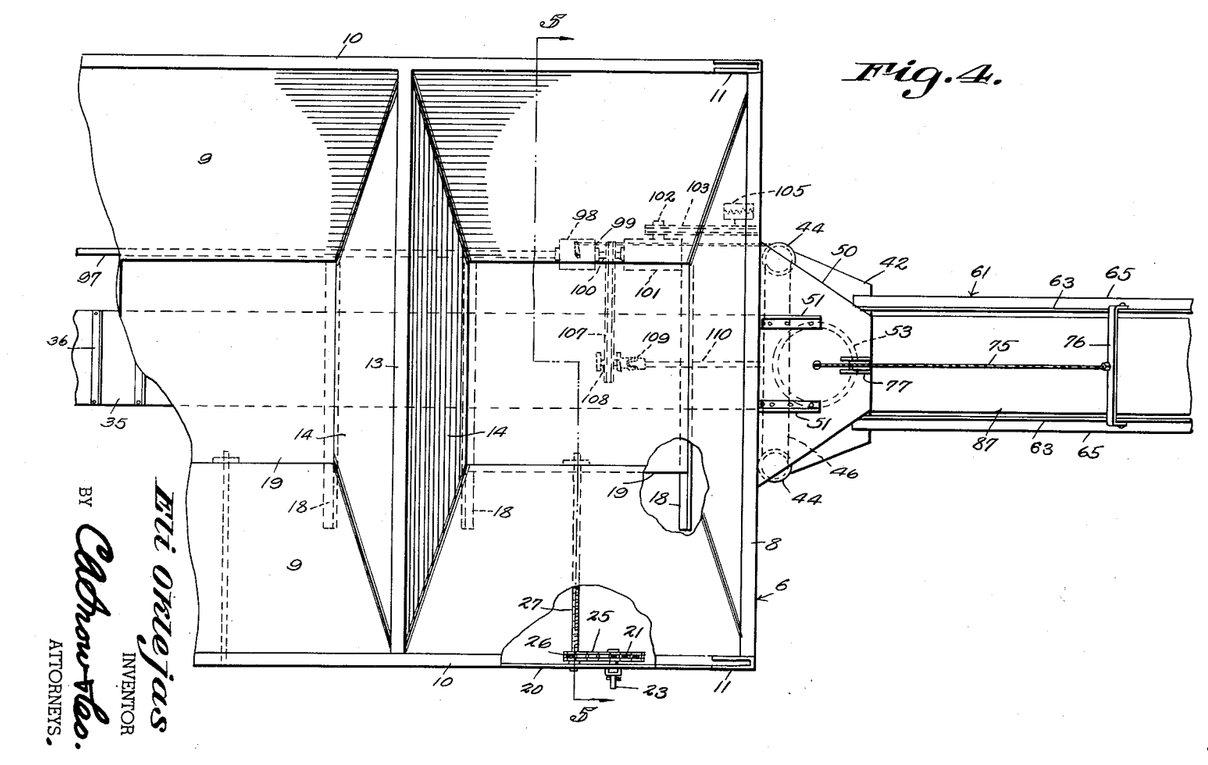
Fig. 4 is a fragmentary top plan view.

The means for driving the conveyors will now be described. In this connection, a power take off 94 (Fig. 1) extending from the vehicle 5 rotates a sprocket 95 around which passes the chain 96 passing around sprocket on one end of drive shaft 97 extended longitudinally of the hopper or body 6 (see Fig. 4), and extending at its other end into a clutch means 98 controlled by operating rod 99. Extending from said clutch means 98 is the shaft 100 that extends into a speed reducer box 101.

So far, the drive means described is common both to the scraper and discharge conveyors.

A take-off for driving the scraper conveyor comprises shaft 102 extending from the speed reducer around which shaft passes the chain 103 also passing around sprocket 104 on which is mounted one portion of a clutch 105 operated through a control 106, the other portion of the clutch being connected to the drive shaft 32 of the scraper conveyor. By reason of this construction, it is seen that the scraper conveyor can be selectively engaged with or disengaged from the common drive, this being for the purpose of permitting the scraper conveyor to be driven simultaneously with the discharge conveyor, or to permit the discharge conveyor to be driven without operating the scraper conveyor.

Extending from the speed reducer 101, for the purpose of driving the discharge conveyor, I provide a shaft equipped with sprocket around which passes the chain 107 for driving the stub shaft 108 universally connected at 109 to the jack shaft 110 which is a spline shaft having a splined connection with the universal 111 from which extends the shaft 112 extending into the lower gear box section 52 (Fig. 8) for the purpose of rotating the small beveled gear 113, that is in mesh with the large beveled gear 114 mounted upon and rotating the stub shaft 115 journaled in the top and bottom of the gear box, there being also rigidly connected to the shaft 115 the beveled gear 116 in mesh with the beveled gear 117 for driving the shaft 118 that extends from the side of the upper gear box section 53. Shaft 118 is provided with a sprocket around which passes chain 119 that also passes around sprocket for the purpose of driving the drive shaft 60 of the discharge conveyor.

I believe it will be apparent, from the above, that by operation of the main clutch 98, the drive means for both the scraper and discharge conveyors can be engaged with the power take-off of the vehicle to be driven thereby. Assuming that it is desired to operate both the conveyors simultaneously, the clutch 98 and the clutch 105 are both engaged. Assuming that it is desired only to operate the discharge conveyor, clutch 98 is engaged while clutch 105 is disengaged.

In any event, I believe the operation of the self-unloading conveyor body, considered from an overall standpoint will be readily apparent. When the body is not in use, the position of the parts will be substantially as shown in Fig. 1. In this position, the discharge conveyor is hoisted by operation of the means 75 to its uppermost position, so as to be out of the way during movement of the vehicle 5. The vertically slidable support for the discharge conveyor is adjusted to its uppermost position, and the gates 19 are of course closed for the purpose of preventing material from gravitating from the compartmented body.

Figures 2, 9:
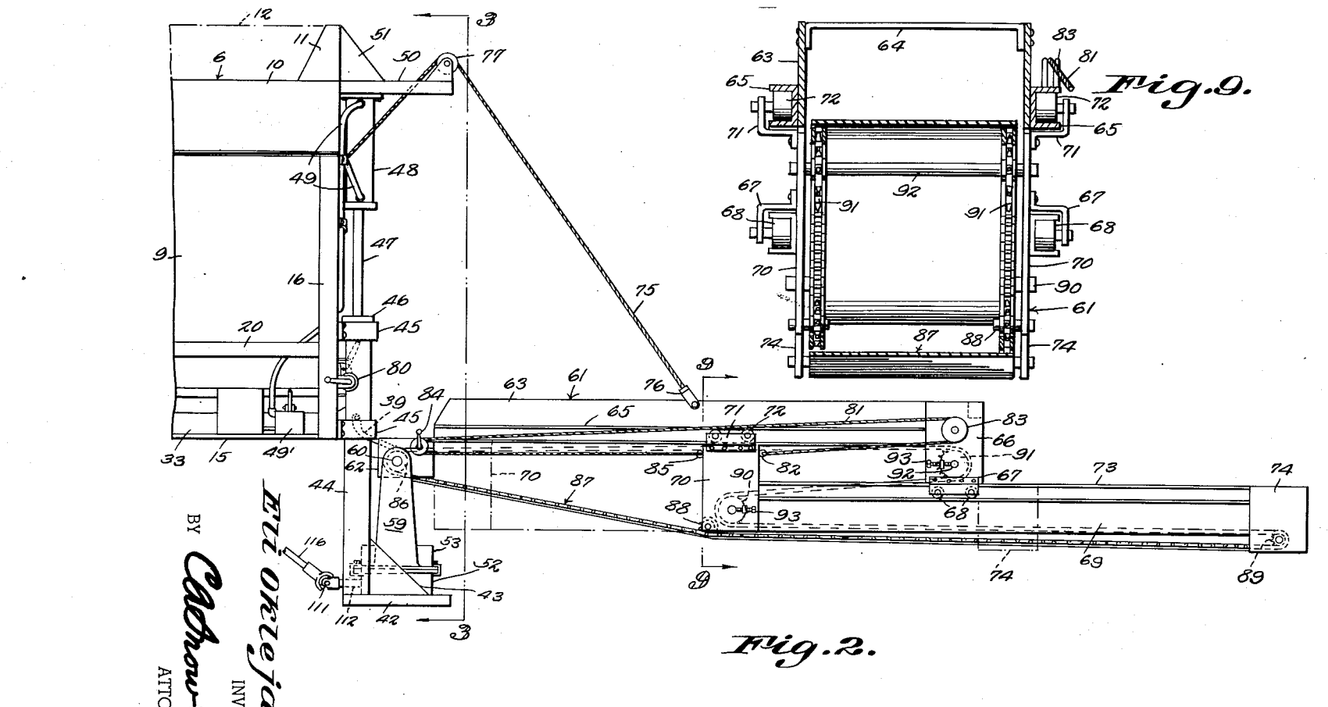
Fig. 2 is a fragmentary side elevation showing the discharge conveyor positioned ready for use.
Fig. 9 is an enlarged section on line 9—9 of Fig. 2.

When it is desired to operate the self unloading conveyor body, the discharge conveyor is lowered to a position as shown in Fig. 2, and is extended as much as desired. The discharge conveyor is swung laterally by simple exertion of manual pressure thereagainst, and when swung laterally to a desired position, the means 57 is employed for the purpose of locking it in laterally adjusted position. The discharge conveyor, then, is readily understood as being capable of discharging the material at any selected point laterally of the vehicle, upwardly, downwardly, and at any distance away from the rear of the vehicle.

When the necessary adjustments have been made, and the support for the discharge conveyor has been lowered so as to position the tail end of the discharge conveyor below the chute 39, the high speed gates are opened, for the purpose of permitting the material to gravitate to the scraper conveyor, and the clutches are engaged for the purpose of discharging said material. The material, gravitating through the bottoms of the open compartments, will be carried rearwardly by the scraper conveyor, and will discharge upon the tail end of the discharge conveyor, after which it will be moved to the discharge point. Whenever appropriate, the scraper conveyor can be declutched, while the discharge conveyor can remain in operation until all the material has been disposed of.

What is claimed is:

1. A self unloading conveyor structure including a hopper, a discharge conveyor support mounted thereon for vertical sliding adjustment, and a discharge conveyor mounted on said support for swinging in vertical and horizontal planes.

2. A self unloading conveyor structure including a hopper, a discharge conveyor support slidably mounted on the rear end of the hopper for vertical adjustment, and a discharge conveyor swingably connected at one end to said support for movement in vertical and horizontal planes.

3. A self unloading conveyor structure including a hopper, a discharge conveyor support mounted for vertical sliding adjustment on the rear end of the hopper, a universal mount carried by said support, a discharge conveyor connected at one end to said mount, and a drive means within said mount and operatively linked to the conveyor for driving the same in any position of the conveyor.

4. A self unloading conveyor structure including a hopper, a discharge conveyor support mounted for vertical sliding movement on the rear end of the hopper, a gear box mounted on said support and including a fixed lower gear box section, an upper gear box section rotatable upon the lower section, upstanding arms rigid with the upper section, and a chain of gears within said sections and meshing in any position of relative rotary adjustment of the sections, and a discharge conveyor swingably mounted between the arms and operatively linked with said gears in a manner to be driven by the gears.

5. A self unloading conveyor structure including a hopper, a scraper conveyor mounted beneath the hopper and extended longitudinally thereof to convey to one end of the hopper material gravitating therefrom, a discharge conveyor support mounted for vertical sliding adjustment on said end of the hopper, a discharge conveyor universally mounted on said support and positioned to receive material conveyed by the scraper conveyor, and means for simultaneously driving both conveyors in selected relative positions thereof.

6. A self unloading conveyor structure including a hopper having openings at its lower end, a scraper conveyor extended longitudinally of the hopper and below said openings and adapted to deliver material gravitating through the openings to one end of the hopper, a discharge conveyor support vertically slidable on said end of the hopper, a discharge conveyor universally mounted on said support, said mounting of the discharge conveyor on the support including relatively rotatable gear box sections, and a power transmission operatively linked with the scraper conveyor and extending through the gear box sections for powering the discharge conveyor.

7. A self unloading conveyor structure including a hopper having bottom openings, a scraper conveyor mounted on the underside of said hopper and traversing said openings for delivering material gravitating therethrough to one end of the hopper, a discharge conveyor support vertically slidable on said end of the hopper, a universal mount on said support, a discharge conveyor connected at one end to said mount, means for extending the length of the discharge conveyor, and a power transmission for both conveyors operatively linked with the scraper conveyor and extending through said mount to the discharge conveyor, said power transmission adapted to drive the discharge conveyor in any position to which swung on said mount and to which extended.

8. A self unloading conveyor structure including a hopper, said hopper having bottom openings, a scraper conveyor mounted on the underside of the hopper and traversing said openings longitudinally of the hopper for delivering material to one end of the hopper, gates slidably mounted in the hopper walls above said conveyor and adapted for normally closing the openings, high speed gate opening means adapted for opening or closing of the gates, a discharge conveyor support vertically slidable on one end of the hopper, a discharge conveyor universally mounted on said support, means for extending the discharge conveyor to selected lengths, and power transmission means for both conveyors adapted for driving of the conveyors in any relative position thereof, said power transmission adapted to drive the discharge conveyor in any position to which said discharge conveyor is extended.

9. In a self unloading conveyor structure a hopper adapted for mounting upon a vehicle, said hopper having bottom openings, gates normally closing said openings, high speed gate opening means for the openings, a scraper conveyor mounted on the underside of the hopper below the openings and adapted to deliver material gravitating through the openings to one end of the hopper, a discharge conveyor support mounted for vertical sliding adjustment on said end of the hopper, relatively rotatable gear box sections mounted on said support, an extendable discharge conveyor connected at one end to one of said sections for vertical swinging movement, thus to provide a universal mount of the discharge conveyor on said support, hydraulic means for adjusting said support to positions of vertical sliding adjustment, a hoist connected to the discharge conveyor and mounted upon the hopper for adjusting the discharge conveyor to selected positions of vertical swinging adjustment, a power transmission operatively linked with the scraper conveyor and extending through the gear box sections to the discharge conveyor, for powering the discharge conveyor in any selected position of relative rotary adjustment of the gear box sections, and clutch means for selectively engaging and disengaging said conveyors with the power transmission.

ELI OKLEJAS.

REFERENCES CITED

The following references are of record in the file of this patent:

UNITED STATES PATENTS

| Number | Name | Date |
| --- | --- | --- |
| 252,623 | Reeves | Jan. 24, 1882 |
| 399,312 | Arbogast | Mar. 12, 1889 |
| 633,202 | Lamm | Sept. 19, 1899 |
| 679,903 | Mullaney | Aug. 6, 1901 |
| 1,515,327 | Barkmann | Nov. 11, 1924 |
| 2,169,890 | Zink | Aug. 15, 1939 |
| 2,205,013 | Joy | June 18, 1940 |
| 2,451,656 | Birch | Oct. 19, 1948 |
| 2,488,407 | Hoffstetter | Nov. 15, 1949 |

FOREIGN PATENTS

| Number | Country | Date |
| --- | --- | --- |
| 309,751 | Germany | Feb. 19, 1911 |